Patented Dec. 23, 1941

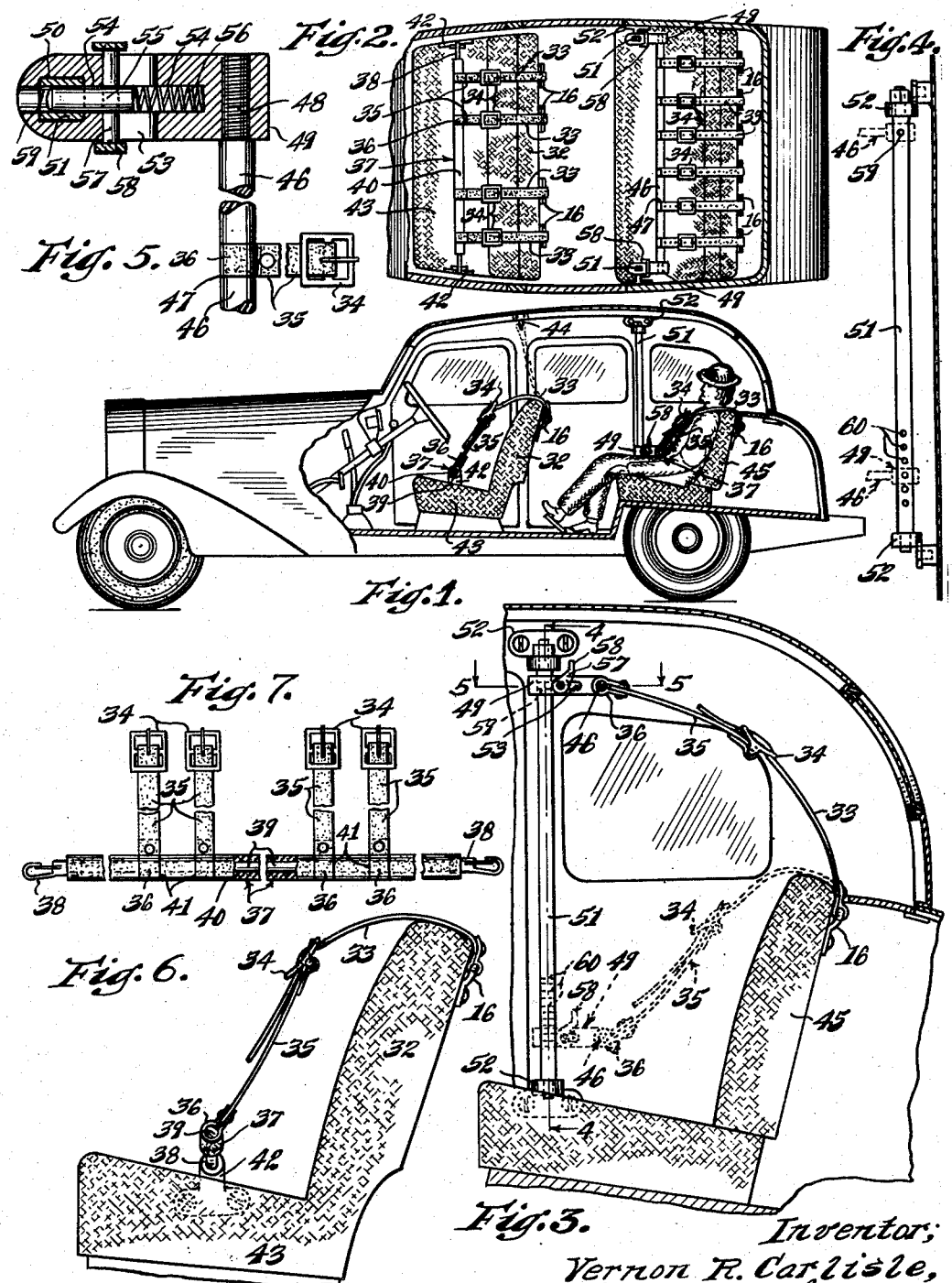

2,267,373

UNITED STATES PATENT OFFICE 2,267,373

SAFETY DEVICE FOR VEHICLES

Vernon R. Carlisle, Kenosha, Wis.

Application August 27, 1938, Serial No. 227,032

7 Claims. (Cl. 155—189)

This invention relates to improvements in safety devices for vehicles, and more particularly to improvements in safety devices in respect of seats for vehicles such as passenger automobiles, busses, trains and trucks.

Long observation and study on the part of the applicant has led him to the conclusion that a large number of fatalities and injuries could be avoided if proper safety devices were placed on the seats of vehicles and if the persons using the seats utilize the safety devices. As is well known, when a vehicle is in a collision the vehicle may be stopped but the tendency of the body of a passenger is to move forward and crash through a windshield, etc., or against some other object causing injury or fatality. It is believed that there is no more effective way to minimize injuries and fatalities resulting from accidents than by furnishing proper safety devices for said vehicles. To that end, it has been an object of my invention to provide safety devices for vehicles such as straps or other similar devices which will effectively limit the movement of an occupant of a vehicle which is stopped in collision so as to prevent or minimize injury to the occupant.

Another object has been to provide safety devices of this kind which may be easily utilized and which may be adjusted and which may be arranged out of the way when not in use.

Another object has been to provide safety devices of the kind described which are inexpensive to produce and simple to attach and install.

These and other objects and advantages will appear more fully in the hereinafter specification when taken in connection with the accompanying drawing, in which:

Fig. 1 is a side view of an automobile, partly in section, illustrating one form of safety device;

Fig. 2 is a plan view, partly in section, of the cab portion of an automobile illustrating the form shown in Fig. 1;

Fig. 3 is an enlarged sectional view of the rear portion of the cab, as shown in Fig. 1;

Fig. 4 is a section on the line 4—4 of Fig. 3 showing one of the vertical supporting posts;

Fig. 5 is an enlarged fragmentary sectional plan view taken on the line 5—5 of Fig. 3 of the locking means illustrated in Figs. 1, 2, 3 and 4;

Fig. 6 is an enlarged view of the front seat of the cab, shown in Fig. 1; and

Fig. 7 is a plan view, partly in section, of the horizontal support of Fig. 6.

Referring more particularly to the drawing wherein I have illustrated various means of applying the principles of my invention, and more particularly to Figs. 1 to 5 inclusive, I have shown a conventional seat of an automobile with a bracket 16 on the back near the top thereof, there being a pair of these brackets. A pair of straps 33 are secured at one end to these brackets and these straps are provided with a plurality of holes in their free end portions. The straps 33 at their free ends are adapted to be secured by means of buckles 34 to the free ends of straps 35. At the other ends of straps 33 the same are provided with loops 36.

Referring to the form shown in Figs. 1, 2, 3, 4 and 5, I have disclosed a front seat back 32 provided with the brackets 16 having straps 33 like the straps 17 in Fig. 1, except shorter, and these straps are adapted to be adjustably connected by means of buckles 34 to straps 35. The loops 36 may be formed on straps 35 by means of riveting as will be readily understood. Adapted to extend through the loops 36 of the four straps for the front seat, two for each person seated the same as previously described, as clearly shown in Figs. 2 and 7, is a horizontal supporting member 37 provided at its end with snap fasteners 38. The horizontal member 37 may be formed of a heavy wire 39 secured to the snap fasteners 38 and the horizontal supporting member may be provided with a cover 40 of rubber, plush, etc. This covering 40 may have cut-outs 41 to accommodate the strap loops 36. The horizontal supporting member 37 may be secured by snapping the snap fasteners to eyelet or loop brackets or loops 42 which may be secured to the seat 43. Ring or loop brackets or loops 44 may be provided on the roof of the cab, and when the safety device is not in use it may be arranged out of the way by snapping the snap fasteners 38 on to the ring brackets 44. It will thus be seen that after a person has taken his seat in using the form of safety device illustrated in Figs. 1, 2, 6 and 7, the horizontal supporting member 37 is disposed over the legs, when the fasteners 38 may be snapped to the eyelet bracket 42 and the straps 33 and 35 may first be opened by means of the buckles 34 to allow a person to be seated and also proper adjustments may be made with the straps by means of the buckles to accommodate the straps to the user, it being understood that the parts are adjusted to different persons according to their sizes or desires. It will thus be seen that the straps across the shoulders and the horizontal supporting element 37 will give adequate protection against the body being hurled off the seat.

In Figs. 1, 2, 3, 4 and 5 I have illustrated a form of safety device which may be effectively employed on the back seat 45. Adapted to be secured to brackets 16 on the back seat 45 are a pair of straps 33 for each person or a plurality of pairs of straps in all, sometimes four or six according to whether there are two or three persons in a seat which, in turn, are adapted to be secured by means of buckles 34 to a pair of straps 35 remote from brackets 16. These straps 35 are provided with loops at their other or lower ends opposite the buckles 34. Adapted to extend through the loops 36 is a horizontal cross bar 46 having annular seat grooves or recesses 47 to receive and position the loops 36 of the straps 35. The ends of the bar 46 are threaded as at 48 into adjustable block members 49, clearly shown in Fig. 5. The block members have vertical slots 50 through which vertical posts 51 are adapted to extend, the upper and lower ends of the posts 51 having and being mounted in brackets 52 secured to the sides of the cab. A transverse horizontal slot 53 is provided in each block and also a central longitudinal bore 54. Adapted to ride in said bore 54 is a plunger 55 held normally so as to tend to lock the vertical post 51 to the blocks 49 by means of a spring 56. Fixed to each plunger 55 of which there are a pair, is a release element or cross pin 57 having an operating handle 58 on one or both ends spanning the slot for releasing the plunger. As shown in Fig. 8 each vertical post 51 has an upper hole 59 and a plurality of holes 60 adjacent the lower part of the post 51, for vertical adjustment of the horizontal cross bar 46 with reference to the vertical posts 51.

In normal condition in the form shown in Fig. 3 the straps may be positioned out of the way as shown in that figure. To do this all that is necessary is to grasp the operating handles 58 and pull the plunger toward the rear out of the holes of the vertical posts 51 and then the horizontal cross bar 46 may be pushed so as to ride upwardly upon the vertical posts 51 until the plungers of the guide blocks on the horizontal cross bar enter the upper holes 59 on the vertical posts 51 in which case the plungers will enter the holes to keep the cross bar in raised out of the way position.

When it is desired to use the safety device all that is necessary is that a party assume one of the three seats provided in the case where three pairs of straps are used and position himself beneath one of the pairs of said straps with his head between the straps and then he may grasp the operating handles 58 to pull the plungers out of the top holes of the vertical posts 51. When this has been done the cross bar with its blocks may be allowed to ride down the vertical posts 51 to a desirable level when the plungers may again be locked in a pair of registering holes. It will also be understood that not only may adjustment be provided for in the height of the cross bar but also the straps by means of the buckles may be adjusted.

It will be understood that it is not necessary that the parts and straps need be made of the materials mentioned but other equivalent materials may be used. For example, the horizontal member 37, illustrated in Fig. 6, may be made of webbing or leather and of course, the straps may be made of webbing or other equivalent material. Also it will be understood that my invention is not limited to locating the parts in the places shown for illustration but for example, it will be understood that the eyelet brackets, loops or eye-bolts may be located on the seat or on the floor in the middle of the front of the seat and the strap 35 may extend downwardly between the legs of a person and the strap snapped on to the eyelet bracket, loop or eye-bolt by means of the snap fastener and, for example, the straps may extend over the sides of the seats and the front of the seats and may be snapped to eyelet brackets, loops or eye-bolts anchored either to the floor or to the seats. Also, for example, it will be understood that the invention is not limited to eyelet brackets, loops or eye-bolts and snap fastening means but other equivalent means may be used, nor is my invention limited to the buckles shown or to buckles at all and other equivalent means may be substituted for fastening or adjustment.

While I have illustrated and described the preferred form of construction for carrying my invention into effect, this is capable of variation and modification without departing from the spirit of the invention. I, therefore, do not wish to be limited to the precise details of construction set forth, but desire to avail myself of such variation and modifications as come within the scope of the appended claims.

Having thus described my invention, what I claim as new and desire to secure by Letters Patent is:

1. In a safety device of the kind described for a seat for a vehicle, a pair of straps in front of the seat for each person, each secured to the seat back of said seat at one end, means for securing said straps at their other ends, said means including loops on said straps, a horizontal supporting member at the front of the seat engaged with the loops and provided with fastening means, means for securing said horizontal supporting member relative to said seat to extend across the front of a seated person, said means including means with which said fastening means are adapted to lock, and means for securing said straps in an out of the way condition when said straps are not in use.

2. In a safety device of the kind described for a seat of a vehicle, a pair of straps in front of the seat for each person each secured at one end to said seat, means for securing said straps at their other ends, said means including loops on said straps, and a horizontal cross bar in front of the seat provided with recesses to accommodate said loops, said cross bar being provided with adjustable block members, vertical posts adapted to extend through said block members, said vertical posts being provided with a plurality of holes, each adjustable block member being provided with a releasable plunger, the said plungers being adapted to fit into a pair of oppositely registering holes on the vertical posts to retain the horizontal cross bar at a desired elevation.

3. In a safety device of the kind described for a seat of an automobile or similar vehicle, a plurality of straps in front of the seat for each person each secured to said seat at one end over the back of the seat and means for securing the straps at their lower ends adjacent the seat portion at the front of the seat and including loops on the lower ends of the straps and a horizontal member in front of the seat and anchored at its ends, to which the loops are connected in spaced relation and adapted to extend across the front of a seated person to restrain a person in the seat from displacement relative thereto.

4. In a safety device of the kind described for a seat of a vehicle, a pair of straps for each person, each secured at one end to said seat, means for securing said straps at their other ends, said means including loops on said straps, and a horizontal cross bar provided with recesses to accommodate said loops, said cross bar being provided with adjustable members, vertical posts adapted to extend through said members, said vertical posts being provided with a plurality of holes, each adjustable member being provided with a releasable plunger, said plungers being adapted to fit into a pair of oppositely registering holes on the vertical posts to retain the horizontal cross bar at a desired elevation.

5. In a safety device of the kind described for a seat of a vehicle having a cushion and a back, a pair of straps having means anchoring the upper ends thereof near the top of and in rear of the back and extending downwardly in front of the same and a cross member having spaced recesses, and anchored adjacent the sides of an automobile, the lower ends of said downwardly extending straps having means for anchoring the same to the cross member at the recesses, said cross member adapted to extend across the front portion of a body seated in said seat.

6. In a safety device of the kind described for a seat of a vehicle, a plurality of spaced upwardly and downwardly extending straps for each person, each extending over the top of the seat back and secured to the back of said seat at one end and means for securing said straps at their other ends, said means including loops on said straps and a horizontal supporting member extending across the front of a seated person and engaged by the loops and anchored at its ends adjacent the sides of the vehicle, said horizontal supporting member having spacing means receiving the loops therebetween.

7. In a safety device for automobiles and the like for attachment to a seat thereof, a pair of straps in front of the seat for each person, each strap being secured at one end to said seat, means for securing said straps at their other ends, said means including loops on said straps at said other ends, a horizontal supporting member engaged by said loops and extending across the front of a seated person and provided with snap fasteners at its ends and means at the ends of the seat for anchoring the ends of the horizontal member by engagement with said snap fasteners, said means including eyelets with which said snap fasteners are adapted to lock.

VERNON R. CARLISLE.